(12) United States Patent
Eide

(10) Patent No.: US 9,242,405 B2
(45) Date of Patent: Jan. 26, 2016

(54) METHOD FOR MANUFACTURING AN ELONGATED OBJECT BY SPINNING AT LEAST ONE CURABLE MATRIX COATED THREAD ON A CORE ELEMENT

(76) Inventor: Morten Eide, Levanger (NO)

(*) Notice: Subject to any disclaimer, the term of this patent is extended or adjusted under 35 U.S.C. 154(b) by 260 days.

(21) Appl. No.: 13/699,938

(22) PCT Filed: May 25, 2010

(86) PCT No.: PCT/NO2010/000189
§ 371 (c)(1),
(2), (4) Date: Nov. 26, 2012

(87) PCT Pub. No.: WO2011/155844
PCT Pub. Date: Dec. 15, 2011

(65) Prior Publication Data
US 2013/0062452 A1    Mar. 14, 2013

(51) Int. Cl.
*B29C 53/70* (2006.01)
*F16L 1/12* (2006.01)
*F16L 9/12* (2006.01)
*B29L 23/00* (2006.01)

(52) U.S. Cl.
CPC .............. *B29C 53/70* (2013.01); *F16L 1/123* (2013.01); *F16L 9/12* (2013.01); *B29L 2023/22* (2013.01)

(58) Field of Classification Search
CPC ........................... B29C 53/70; B29L 2023/22
USPC ......................... 156/173, 175, 169, 149, 425
See application file for complete search history.

(56) References Cited

U.S. PATENT DOCUMENTS

| 2,434,073 | A | * | 1/1948 | Isenberg | 156/431 |
| 3,203,845 | A | * | 8/1965 | Short | 156/175 |
| 3,532,132 | A | | 10/1970 | Rubenstein | |
| 4,078,957 | A | * | 3/1978 | Bradt | 156/173 |
| 4,432,302 | A | * | 2/1984 | Farris et al. | 118/410 |
| 4,651,914 | A | | 3/1987 | Sprung et al. | |

FOREIGN PATENT DOCUMENTS

| GB | 1228244 A | | 4/1971 |
| GB | 1387180 A | * | 3/1975 |
| GB | 1489186 A | | 10/1977 |
| WO | 9803326 A1 | | 1/1998 |

OTHER PUBLICATIONS

International Search Report and Written Opinion dated Aug. 18, 2010.

* cited by examiner

*Primary Examiner* — Jeff Aftergut
(74) *Attorney, Agent, or Firm* — Alix, Yale & Ristas, LLP

(57) ABSTRACT

Method and device for manufacturing an object (1) by spinning at least one thread (5) or band with a hardenable matrix onto a core element (4), the thread (5) or band being carried by a spool (2) which rotates in relation to the core element/object (4/1) at the same time that the spool (2) moves chiefly in one specific length direction in relation to the object (1) so that the object (1) is continuously pulled off the core element (4). In addition to the movement in the specific length direction, a back and forth movement is conducted between the spool (2) and the core element/object (4/1) over a predetermined part of the core element's/object's (4/1) length so that the thread (5) or band is applied chiefly from the object's inner surface to its outer surface while forming a 4-dimensional structure.

18 Claims, 3 Drawing Sheets

Figure 1:
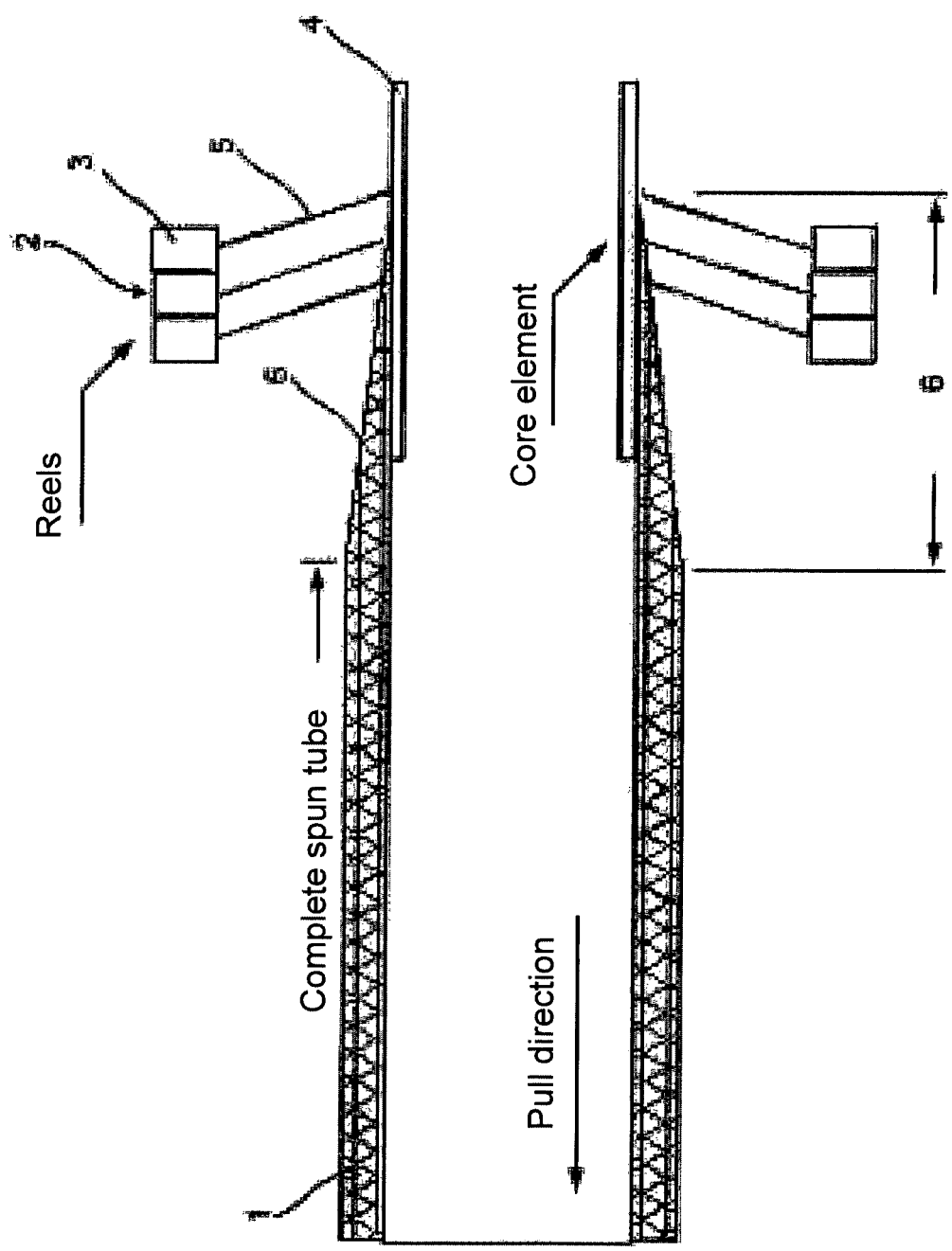

METHOD FOR MANUFACTURING AN ELONGATED OBJECT BY SPINNING AT LEAST ONE CURABLE MATRIX COATED THREAD ON A CORE ELEMENT

BACKGROUND

The present invention involves a process of manufacturing an elongated object by spinning at least one thread or band with a curable matrix on a core element, where the thread or band is carried by a spool and the spool is rotating around the core element at the same time as the elongated object or the spool moves chiefly in one specific length direction, so that the elongated object is constantly pulled out of the core element. The thread/s or band/s will now constitute a three-dimensional web from the inner to the outer diameter of the tube with a specified length.

The process is particularly well suited for manufacturing tubes and protective sleeves or reinforcing covers for bundles of tubes and/or cables, but can also be used for manufacturing objects of finite forms where strength is a critical factor, such as aeroplane wings or windmill blades.

Protective sleeves are vital for bundles of tubes and cables deployed on the seabed, as such tubes and cables may easily be damaged by fishing equipment, anchors and other objects being dragged along the seabed. Today protective sleeves manufactured in lengths of a few metres are used. These are strapped on to the tube or cable as they are deployed out into the sea. An example of this is shown in NO323381. This method of adapting a protective sleeve is very work demanding and slows down the deployment considerably, at the same time making quality assurance very challenging.

There are several examples of manufacturing tubes continuously as they are being deployed. Examples of this are shown in GB 1489186, U.S. Pat. Nos. 2,605,202, 3,532,132, 4,721,410, 4,183,724, 1,084,158, 4,345,854, 2,718,684, 4,651,914 and 5,062,737.

Most of these examples are concerned with the continuous pouring of concrete pipes. In many cases the use of concrete for making a protective sleeve is not a good solution. The concrete needs considerable time to harden, and this slows down the deployment. Concrete is also heavy, creating the need for big vessels for such deployment.

U.S. Pat. No. 4,558,971 describes continuous manufacturing of plastic tubes. With this method a band is wound around an internal stem by several spools with bands in a resin matrix circulate around the stem. The spools wind the band in opposite directions, whereby a pattern of crossing bands is achieved.

The bands are wound in such a way that the reels that are first in the spool will place their band at the innermost part of the tube, whereas the reels that are last in the spool will apply their band at the outermost part. This will give the tube a layered structure which gives a risk of delamination of the tube's wall that leads to a tube of relatively low strength.

Furthermore it is—because of the internal stem—not possible to wind the tube as a protective sleeve covering a tube or a cable. The finished tube may therefore only be used as a reinforcement of an existing object.

The publication GB 1228244 basically describes the ordinary machine used today for manufacturing fibre tubes. The tubes may be conical or straight. In the publication there is a drawing of a conical core element which gives a conical tube, e.g. for lighting poles. These products are of specific length identical to the length of the core element. In the illustration the core element is attached in both ends (supporting pins 14 and 16), and 16 is also attached to an engine.

According to GB 1228244 a thread is wound from one end to the other, where it turns and winds another layer on top of the previous one as it returns to the starting point. The fact that the core element 10 is conical does not influence that, but it gives a conical product. If the core element is straight, you will get the same function. This gives a static cross pattern where the only thing that can be adjusted is the crossing angle between the separate layers of the product.

GB 1228244 has an engine 18 connected to supporting pin 16, which gives a rotation to the core element 10 so that the fibres may be wound upon the product. The use of such a rotation would make it impossible to manufacture tubes for deployment directly into the sea or into the terrain.

The machine according to WO 9803326 produces a tube with a pattern almost identical to that of the above commented GB1228244, and it, too, does not spin in a 3D pattern.

SUMMARY

The object of the present invention is to produce a tube/protection which does not have the same diameter as the product(s) needing protection. There needs to be a considerable distance between the two in order to enable the circulation of water or cooling liquid around the products to be protected, the protection coating at the same time functioning as a physical protection. This means that the protective tube should be produced without it surrounding a core element.

The present invention aims at providing a method by which it is possible to make an elongated object of great strength. This enables the manufacture of objects with thinner walls and consequently lower weight.

This is achieved according to the disclosure by, in addition to the movement in the specific length direction, a back-and-forth movement between the spool and the core element/the tube over a part of the length of the core element/tube in such a way that the thread or the band chiefly is applied from the inner surface to the outer surface of the object.

By specific length direction is meant according to the disclosure the resulting relative movement between the spool and the elongated object.

More concretely the disclosure concerns a method as defined by claim 1 and a device as claimed in claim 13.

When indicated that the spool is moved back and forth in relation to the object as well as in a specific direction in relation to the object, it is in both cases arbitrary whether the spool is moved while the object is stationary or the opposite. As an example the spool may be given the back and forth movement while the object may be given the movement in one specific direction.

The work sequence of spinning conducted during one back and forth movement (or forth and back movement) of the spool in relation to the object, is also referred to as one cycle of the spinning.

In one embodiment it is possible to apply a continuous protective sleeve around a tube or a cable or a bundle of these, where the sleeve is not necessarily placed close to the tube or the cable, but may be applied with a distance between them.

The procedure is well suited for applying a protective sleeve around a cable, a tube or a bundle of cables and/or tubes during the deployment of the cables or tubes.

The procedure also makes it possible to apply a protective sleeve around elongated objects of a varying diameter, e.g. a seismic seabed cable with geophones.

The procedure is also very suitable for applying a protective sleeve around a cable or tube which should not be subject to the clamping forces of straps or which cannot withstand the strains of a protective sleeve applied directly on the cable.

In the space between the cable/tube and the protective sleeve there could possibly be a layer of foam or another material suitable for keeping the cable/tube in position inside the sleeve.

The procedure is also suitable for the manufacture of elongated objects of both limited and unlimited length.

BRIEF DESCRIPTION

Figure 2:
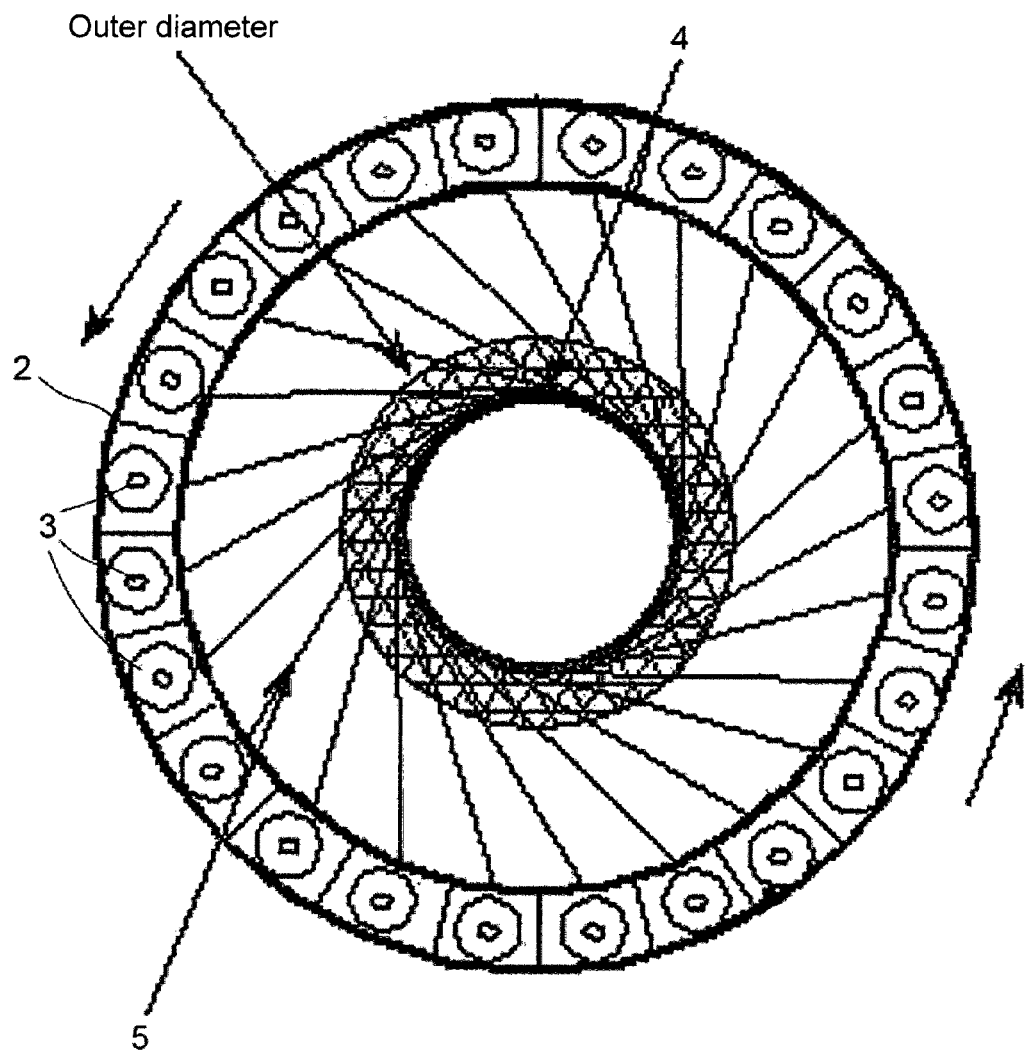
Figure 3:
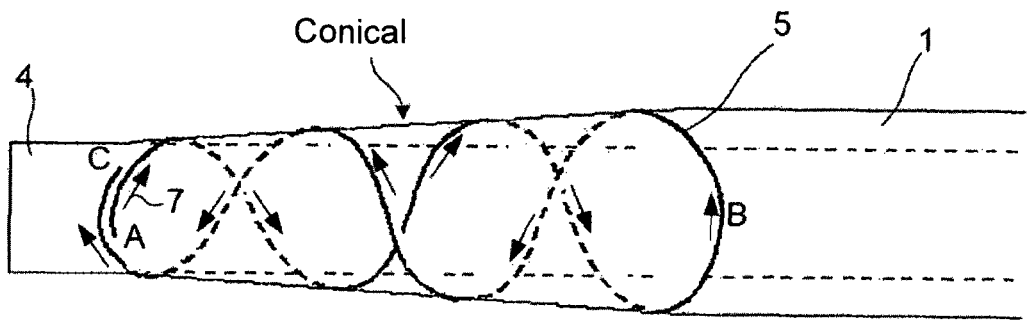
Figure 4A:
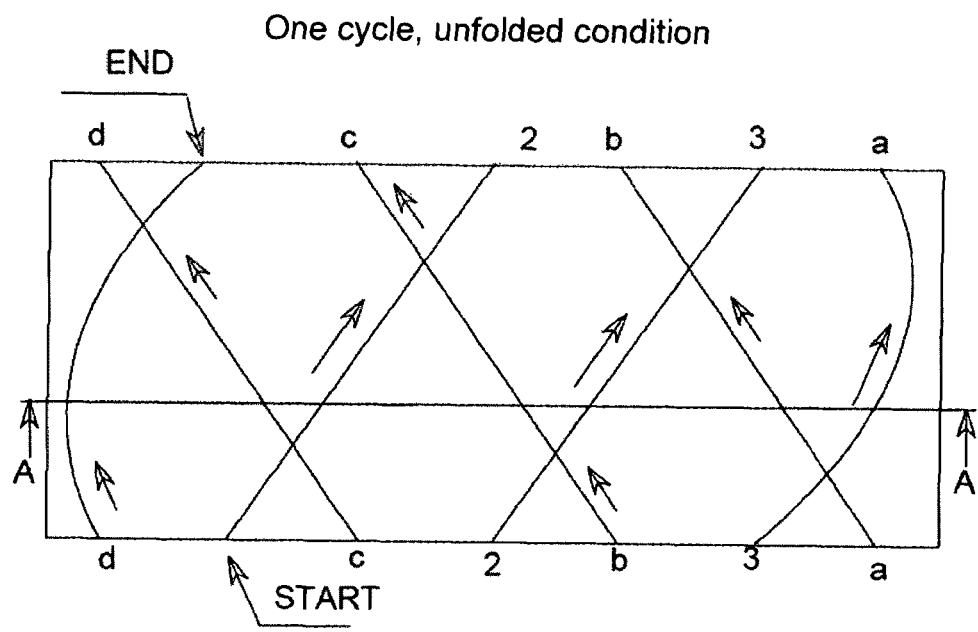
Figure 4B:

The principles of the present disclosure will now be explained in detail with reference to the attached figures showing a possible construction layout of the invention where:

FIG. 1 shows a longitudinal section through on object having the form of a protective sleeve during manufacturing, FIG. 2 shows a cross section through the protective sleeve of FIG. 1 during manufacturing, FIG. 3 shows how a thread is placed in the protective sleeve during one complete movement back and forth (one cycle), FIG. 4a shows the thread pattern for one cycle of the protective sleeve in an unfolded condition, and FIG. 4b shows the thread pattern of FIG. 4a in a longitudinal section through the relevant part of the protective sleeve.

DETAILED DESCRIPTION

FIG. 1 shows a longitudinal section through an object in the form of a protective sleeve during its manufacturing. For this is used a ring or a spool 2 to which is applied a great number of reels 3 for the threads (see also FIG. 2). The spool 2 rotates in such a way that the thread reels 3 move in a preferably circular movement. Concentric to the spool 2 a core element in the form of a supporting tube 4 is arranged. As the thread reels 3 move in circles around the supporting tube 4 a thread 5 is applied from each of the reels on the supporting tube. The spool 2 also moves in the direction along the tube 4 in a back-and-forth movement on part of the length direction of the tube 4.

The thread is covered with a hardenable matrix, e.g. heat hardened or chemically hardened glue or resin. By the use of heat hardened glue or resin the tube 4 can be heated to a temperature that makes the glue harden within a predetermined time period. As the glue is hardened the spun sleeve 1 is continuously pulled off the tube 4. The thread 5 will then attain a conical form 6 on the tube 4. In stead of pulling the finished sleeve 1 the tube 4 and the spool 2 may be shifted in the opposite direction. The supporting tube 4 has a surface which does not adhere to the hardened glue. The glue will preferably form a glide layer which makes it easy to pull the finished sleeve off.

The spool 2 rotates and moves back and forth along the cone by the use of familiar technology. The cone 6 is the area on the sleeve which at any time is being coated with thread, i.e. the area between the outer limits of the spool 2 current back and forth movement along the longitudinal axis of the tube 4. In this way a braided pattern is achieved. This braided pattern captures the tensional forces moving outwards inside the sleeve structure, since the thread 5 turns at the supporting tube 4 (interior) and returns from the finished exterior surface of the sleeve 1. Thus every thread does not only extend round the sleeve but also diagonally from the interior wall to the exterior wall of the sleeve 1. This way the spinning can continue even in the case of simultaneous break of all threads without any defect occurring in the sleeve formed. The spool 2 movement and the pulling speed of the sleeve 1 are preferably controlled by a computer.

As shown in FIG. 1 several spools can be mounted side by side to apply threads parallel to each other.

FIG. 3 shows how one thread 5 will be placed in the sleeve 1 during one complete movement by the spool. The applying of the thread starts by A and the thread will be mounted in the direction of the arrow 7. Halfway between A and B the spool will have rotated once. At point B the spool 2 will have rotated e.g. twice and have moved to the end of the back-and-forth movement. At the same time the thread 5 will have been applied from the diameter of the supporting tube 4 to the outer diameter of the sleeve 1. When the spool returns in the opposite direction the thread 5 will again be applied e.g. in two rotations around the sleeve 1 and from the sleeve's 1 outer diameter to the diameter of the supporting tube 4, ending at C. Due to the overall movement in one direction (towards right in the figure) the point C will be slightly to the left of A. Every thread will be shifted correspondingly as compared to the previous thread. On its way back the thread 5 will be crossing itself at numerous points. When several threads are applied on top of each other in this manner the result will be a strong sleeve wall.

The number of rotations of the spool on each back-and-forth movement can be adjusted, and the number of rotations for each back-and-forth movement does not have to be an integer. The length of the back-and-forth movement can also be varied.

FIG. 4a shows an unfolded cross section of a finished wall, and FIG. 4b shows a longitudinal section through the sleeve wall.

Curing the thread can be done chemically as an alternative to heat, the speed of the movements being adapted to the time needed in order for the sleeve to have the sufficient time to retain a stable form before it is pulled off the supporting tube 4.

To apply the sleeve 1 around an existing cable or tube the cable or tube (not shown) is lead through the supporting tube 4 and then pulled through at the same speed as the sleeve 1 is being pulled off the supporting tube 4. If the manufacturing of the sleeve 1 is taking place aboard a cable deployment vessel the cable and the sleeve can be deployed as soon as the sleeve has been sufficiently hardened during its continuous manufacture. If manufacturing is taking place on land the cable and the sleeve 1 can be coiled onto a drum awaiting transportation.

In addition to spinning a protective sleeve on existing/new cables the method can also be used for reinforcing existing tubes or other objects.

The method is intended for spinning objects where the length may be unlimited. The method is also versatile with respect to the size of the object that is to be spun. In stead of moving the object in one main direction the spool 2 can be moved. This may be appropriate when manufacturing objects of a large diameter. When manufacturing objects of a limited length, the object can be subject of all the movements, both the general back-and-forth movement and the rotation.

The curable matrix can be applied by moisturising the thread before it is applied onto the sleeve. Alternately it can be applied separately by means of separate application means which preferably also is carried by the same spools as the thread reels.

The technology makes it possible to produce objects of both regular and irregular forms. In the latter case an assembled core element with mutually displaceable parts is used, which in two or several steps may be extended and contracted respectively, in order to change diameter during spinning.

Objects of limited length as well as of unlimited length can be manufactured.

The core element need not have circulary cross-section, but may also have oval cross-section or other non-symmetrical cross-sectional shape, suited for forming objects of similar cross-sectional shapes.

The technology is suitable for spinning with a number of natural and synthetic materials, such as textiles, glass-fibre, plastics, ceramics, kevlar and various metals.

A spinning machine based on the technology may be both stationary and mobile; mounted on a ship, a car or other means of transport. A robot-based version of the machine would be able to spin structures in space, in deep sea or in other hostile environments.

The technology can be scaled down to microscopical dimensions or up to dimensions that will enable the production of objects with dimensions of several meters.

If the thread breaks it will not reduce the strength of the finished object produced.

The technology is suitable for later protection of already deployed cables or tubes at sea or on land.

Particularly in relation to use offshore it is a significant advantage to be able to offer, as made possible by the present invention, completed and quality assured cable lengths of 6000 meters or more, carried by and continuously deployed from deployment vessels. The deployment operation is significantly simplified, the weather and wave tolerances are greatly improved and the degree of security with respect to the deployed cable will reach a completely different level than the present one.

The technology also provides other possibilities. If desired the spinning machine can be arranged on a deployment vessel or a pipe deployment rig onshore and the object/tube protection can be spun in connection with the deployment. As a whole this provides a superior method and a superior product. The potential save in a simpler, more rapid and more secure deployment operation is enormous. The same is the added value of a better protected tube/cable on the sea bottom.

The present invention can be used for producing tubes with tailor made properties, thickness, strength, electrical conductivity, isolation, gas tightness, liquid tightness, and so on. It may thus be used in many connections other than oil and gas industry.

Since we are able to make non-corroding, liquid tight tubes, they are suitable for transportation of water in different connections, also water under high pressure.

The objects may also be made gas tight and able to endure loads under extreme conditions, e.g. at great sea depths or in space.

Not the least we will finally emphasize that the present invention provides a possibility of producing a protective casing which is free-standing in relation to the cables or objects to be protected, with the availability of adapting the inner clearance such that for instance additional cables may be drawn through at a later stage and/or so that cooling liquid may circulate within the casing.

The invention claimed is:

1. A method for manufacturing an object (1) by spinning at least one thread (5) with a curable matrix on a core element (4), where the thread (5) is carried by a spool (2) and the spool is rotating in relation to the core element (4) and object (1) and at the same time the spool (2) is moving chiefly in one specific length direction in relation to the object (1) in such a way that the object (1) is continuously pulled off the core element (4), so that an object of unlimited length is produced, wherein, in addition to the movement in the specific length direction, there is a back-and-forth movement between the spool (2) and the core element (4) and object (1) along a predetermined part of the length of the core element (4} and object (1), so that the thread (5) is applied chiefly from the inner surface to the outer surface to form a 3-dimensional structure.

2. The method in accordance with claim 1, wherein the core element (4) has a through opening in its length direction.

3. The method in accordance with claim 1 wherein a cable is pulled through the core element (4) at the same speed as the movement in the specific length direction.

4. The method in accordance with claim 1, wherein the object (1) moves in the specific length direction and the spool (2) moves back and forth relative to the object (1).

5. The method in accordance with claim 1, wherein the spool (2) moves both in the specific length direction and back and forth relative to the object (1).

6. The method in accordance with claim 1, wherein several reels (3) are arranged on a spool (2) rotating around the object (1), and where each reel (3) applies at least one thread (5) onto the object (1) in a 3~dimensional braided pattern.

7. A method for producing a tube, protective sleeve (1) or reinforcement coating from threads (5) wherein the threads have a curable matrix and the sleeve (1) is spun on a core element (4), said threads being carried by a spool (2) and the spool is rotating in relation to the core element (4) and at the same time the spool (2) is moving chiefly in one specific length direction in relation to the core element in such a way that the sleeve (1) is pulled off the core element (4) as it hardens to a stable form while a cable or a tube which will be protected by the sleeve (1) is pulled through the core element (4) at the same time as the sleeve (1) is pulled off the core element (4) in such a way that the sleeve stays around the cable or the tube which it is intended to protect, and a sleeve and cable or tube of unlimited length is produced, and wherein, in addition to the movement in the specific length direction, there is a back-and-forth movement between the spool (2) and the core element (4) along a predetermined part of the length of the core element (4} so that the threads (5) are applied chiefly from the inner surface to the outer surface to form a 3-dimensional structure.

8. The method in accordance with claim 7, wherein a spool (2) with at least one reel (3) for thread (5) rotates around the core element and sleeve (1) winding a thread (5) on the core element (4) and sleeve (1) onto a part of its length.

9. The. method in accordance with claim 8, wherein a spool (2) moves back and forth in the length direction of the core element (4) and sleeve (1) during spinning of the sleeve (1) in such a way that the thread (5) is applied in a conical form on the sleeve (1) so that the tensional forces in such a 3-dimensional structure may be exploited.

10. The method in accordance with claim 8, wherein the thread (5) during each back and forth movement is laid chiefly from the sleeve's innermost surface to its outermost surface.

11. The method in accordance with claim 7, wherein the threads are covered with a curable matrix.

12. The method in accordance with claim 7, wherein there is a possibility of changing the dimensions and form of the core element (4) during the spinning process in such a way that the dimension and form of the sleeve (1) will be changed accordingly.

13. The method in accordance with claim 7, wherein a bundle of cables is pulled through the core element (4) at the same speed as the movement in the specific length direction.

14. The method in accordance with claim 13, wherein the spool (2) is moved in the length direction of a bundle of cables in such a way that a protective layer is spun around the bundle.

15. The method in accordance with claim 7, wherein a tube is pulled through the core element (4) at the same speed as the movement in the specific length direction.

16. The method in accordance with claim 7, wherein the spool (2) is moved in the length direction of a tube in such a way that a protective layer is spun around the tube.

17. The method in accordance with claim 11, wherein the curable matrix is a glue which hardens by chemical reactions or at a certain temperature.

18. A device for manufacturing an object (1) by spinning at least one thread (5) or a band with a hardenable matrix onto a core element (4), the thread (5) being carried by a spool (2) arranged to rotate in relation to the core element (4) and object (1) while the spool (2) moves chiefly in a specific length direction in relation to the object (1) so that the object (1) is continuously pulled off the core element (4) to provide an object of indefinite length, wherein the spool (2) is also arranged to move back and forth in relation to the object (1) during its manufacturing so that the thread (5) is applied in inclined layers from the inner surface of the object (1) to its outer surface to thereby form a 3-dimensional structure.

* * * * *